(12) United States Patent
Meijer et al.

(10) Patent No.: US 9,015,667 B2
(45) Date of Patent: Apr. 21, 2015

(54) FUZZ TESTING OF ASYNCHRONOUS PROGRAM CODE

(75) Inventors: Erik Meijer, Mercer Island, WA (US); Dragos A. Manolescu, Kirkland, WA (US); John Wesley Dyer, Monroe, WA (US); Jeffrey van Gogh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 493 days.

(21) Appl. No.: 12/898,724

(22) Filed: Oct. 6, 2010

(65) Prior Publication Data

US 2012/0089868 A1  Apr. 12, 2012

(51) Int. Cl.
*G06F 9/44* (2006.01)
*G06F 11/07* (2006.01)
*G06F 11/36* (2006.01)

(52) U.S. Cl.
CPC .......... *G06F 11/3692* (2013.01); *G06F 11/076* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 5,628,017 A * | 5/1997 | Kimmerly et al. | 717/127 |
| 6,530,039 B1 | 3/2003 | Yang | |
| 6,557,046 B1 * | 4/2003 | McCauley et al. | 719/318 |
| 6,611,955 B1 | 8/2003 | Logean et al. | |
| 6,701,460 B1 | 3/2004 | Suwandi et al. | |
| 6,925,405 B2 | 8/2005 | Adir et al. | |
| 7,296,257 B1 * | 11/2007 | Dibble et al. | 717/127 |
| 7,797,669 B1 * | 9/2010 | Rehof et al. | 717/100 |
| 8,209,674 B2 * | 6/2012 | Meijer et al. | 717/151 |
| 8,387,016 B2 * | 2/2013 | Tillmann et al. | 717/124 |
| 8,510,715 B1 * | 8/2013 | Ormandy et al. | 717/124 |

(Continued)

FOREIGN PATENT DOCUMENTS

CN  101425035 A  5/2009

OTHER PUBLICATIONS

Godefroid et al., "Automated Whitebox Fuzz Testing," 2008, Proceedings of the Network and Distributed System Security Symposium, San Diego, CA, pp. 1-16, [online], [retrieved on Oct. 24, 2012]. Retrieved from the Internet: http://research.microsoft.com/en-us/projects/atg/ndss2008.pdf.*

(Continued)

*Primary Examiner* — Thuy Dao
*Assistant Examiner* — Stephen Berman
(74) *Attorney, Agent, or Firm* — Nicholas Chen; Kate Drakos; Micky Minhas

(57) ABSTRACT

A fuzz testing system is described herein that represents event sources, channels, processors, and consumers as first-class entities in an application. Abstracting event-related entities allows fuzzing through injecting, dropping, reordering, and delaying events from within the application. This translates into the ability to localize the areas under test and perform fuzzing in a systematic manner. In some embodiments, the fuzz testing system tests concurrent asynchronous and event-based code, and can generate event streams based on a given statistical distribution. Representing events, event sources, processors, and sinks as first-class objects provides easy access to the event handlers and facilitates implementing fuzzing by introducing event processors between the source and the sink. Thus, the fuzz testing system improves the testability of applications and APIs with asynchronous behavior and provides a uniform framework for introducing fuzz testing into such applications.

19 Claims, 4 Drawing Sheets

(56) References Cited

U.S. PATENT DOCUMENTS

| | | | |
|---|---|---|---|
| 8,578,344 B2* | 11/2013 | Godefroid et al. | 717/131 |
| 8,745,592 B1* | 6/2014 | Ormandy et al. | 717/126 |
| 2004/0194065 A1* | 9/2004 | McGrath et al. | 717/124 |
| 2006/0129988 A1* | 6/2006 | Calsyn et al. | 717/124 |
| 2007/0006153 A1* | 1/2007 | Sultan | 717/124 |
| 2007/0074156 A1* | 3/2007 | Nelson et al. | 717/107 |
| 2007/0079288 A1* | 4/2007 | Willwerth et al. | 717/124 |
| 2007/0203973 A1* | 8/2007 | Landauer et al. | 709/203 |
| 2007/0245314 A1* | 10/2007 | Carteri et al. | 717/124 |
| 2007/0266349 A1 | 11/2007 | Craig et al. | |
| 2008/0196025 A1* | 8/2008 | Meijer et al. | 717/177 |
| 2008/0301647 A1* | 12/2008 | Neystadt et al. | 717/127 |
| 2009/0132998 A1* | 5/2009 | Meijer et al. | 717/124 |
| 2009/0164975 A1* | 6/2009 | Natanov et al. | 717/127 |
| 2009/0228871 A1 | 9/2009 | Edwards et al. | |
| 2010/0100871 A1* | 4/2010 | Celeskey et al. | 717/124 |
| 2010/0131556 A1 | 5/2010 | Meijer et al. | |
| 2010/0131921 A1* | 5/2010 | Dyer et al. | 717/107 |
| 2011/0016457 A1* | 1/2011 | Artzi et al. | 717/131 |
| 2011/0314454 A1* | 12/2011 | Godefroid et al. | 717/131 |
| 2012/0151454 A1* | 6/2012 | Artzi et al. | 717/131 |

OTHER PUBLICATIONS

Dawson et al., "Testing of Fault-Tolerant and Real-Time Distributed Systems via Protocol Fault Injection," 1996, Real-Time Computing Laboratory, Electrical Engineering and Computer Science Department, University of Michigan, pp. 404-4114.*

Edwards, "Reactive Extensions for .NET (Rx)," Dec. 2009, pp. 1-42, [online], [retrieved on Oct. 26, 2012]. Retrieved from the Internet: http://orion-edwards-examples.googlecode.com/svn/trunk/dnug/rx-presentation/DNUG%20Reactive%20Framework%20Presentation.pdf.*

Godefroid et al., "Automating Software Testing Using Program Analysis," 2008, Software, IEEE (vol. 25, Issue: 5), pp. 30-37.*

Candea et al., "Automated software testing as a service," Jun. 2010, SoCC '10 Proceedings of the 1st ACM symposium on Cloud computing, pp. 155-160.*

Koski et al., "Fuzz Revisited: A Re-examination of the Reliability of UNIX Utilities and Services," 1995, pp. 1-23.*

Godefroid, "Random testing for security: blackbox vs. whitebox fuzzing," 2007, Proceedings of the 2nd international workshop on Random testing: co-located with the 22nd IEEE/ACM International Conference on Automated Software Engineering, pp. 1-1.*

Shu et al., "Detecting Communication Protocol Security Flaws by Formal Fuzz Testing and Machine Learning," 2008, Formal Techniques for Networked and Distributed Systems—FORTE 2008 Lecture Notes in Computer Science, vol. 5048, pp. 299-304.*

Wassermann et al., "Dynamic test input generation for web applications," 2008, Proceedings of the 2008 international symposium on Software testing and analysis, pp. 249-260.*

"First Office Action Issued in Chinese Patent Application No. 201110317876.5", Mailed Date: Oct. 24, 2013, Filed Date: Oct. 9, 2011, 13 Pages.

"Second Office Action Issued in Chinese Patent Application No. 201110317876.5", Mailed Date: May 30, 2014, Filed Date: Oct. 9, 2011, 11 Pages.

Miller, et al., "An Empirical Study of the Robustness of MacOS Applications Using Random Testing", Retrieved at << ftp://ftp.cs.wisc.edu/paradyn/technical_papers/Fuzz-MacOS.pdf >>, Proceedings of the 1st international workshop on Random testing, Jul. 20, 2006, pp. 9.

Carbin, Michael, "Automatically Identifying Critical behaviors in Programs", Retrieved at <<http://dspace.mit.edu/bitstream/handle/1721.1/55143/599812329.pdf?sequence=1 >>, Sep. 2009, pp. 63.

* cited by examiner

FUZZ TESTING OF ASYNCHRONOUS PROGRAM CODE

BACKGROUND

Modern software development often involves asynchronous programming. Multi-core central processing units (CPUs), networks, distributed systems, sensors, and so on all bring about asynchrony. This corresponds to an increased level of event-based programming, where each of the asynchronous entities interacts with others by raising events. For example, mouse movements generate graphical user interface (GUI) events that encapsulate the cursor's position; the completion of an XmlHttpRequest call generates an event signaling that results are available; and the publication of a blog post produces an event that notifies interested parties that new content is available. Typically, these events are not correlated. For example, a GUI event corresponding to moving the mouse is raised independently of an event signaling the completion of an asynchronous XmlHttpRequest call.

Testing event-based systems involves verifying that the program behaves as expected as events from uncorrelated sources occur. This is a hard problem as verifying all possible permutations exhibits combinatorial explosion. Consequently, testers are increasingly relying on fuzz testing, or fuzzing, which involves randomly generating events from outside of the application under test, and verifying whether the application responds as specified. Fuzz testing can provide much broader coverage for a given amount of effort and is especially favored when budgets and/or time are short.

Fuzz testing is difficult to introduce to some applications. For example, the application may not provide easy entry points for hooking event sources and sinks. Other times it is easy to produce some types of inputs (e.g., calling a registered event handler), but hard to reliably produce sequences of events to test reordered, delayed, duplicate, and/or lost events. Introducing fuzz testing to an application is typically handled differently each time, and each application programmer may repeat work performed many times before to re-implement fuzz testing in a new application.

SUMMARY

A fuzz testing system is described herein that represents event sources, channels, processors, and consumers as first-class entities in an application. Abstracting event-related entities allows fuzzing through injecting, dropping, reordering, and delaying events from within the application. This translates into the ability to localize the areas under test and perform fuzzing in a systematic manner. In some embodiments, the fuzz testing system tests concurrent asynchronous and event-based code, and can generate event streams based on a given statistical distribution. The fuzz testing system connects event sources to event processors. Each processor generates an event stream by applying a transfer function or transformation to its input event stream. The transfer function is selected by the test programmer and can delay, reorder, drop, select a subset, skip, inject new events, and so on. Event sinks are elements that handle the events.

Representing events, event sources, processors, and sinks as first-class objects impacts fuzzing in several ways. First, it provides easy access to the event handlers. Fuzzing can flow from sources through processors into the sinks, or can be injected straight into the processors. Second, it facilitates implementing fuzzing by introducing event processors between the source and the sink. Through operations such as injection and dropping, the fuzz testing system can simulate in a systematic manner a wide range of conditions that fuzzing attempts to cover, including how the application deals with correlation and/or causality between seemingly unrelated event streams. Thus, the fuzz testing system improves the testability of applications and APIs with asynchronous behavior and provides a uniform framework for introducing fuzz testing into such applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A fuzz testing system is described herein that represents event sources, channels, processors, and event sinks as first-class entities in an application. All event handling within the application entails these abstractions. Abstracting event-related entities allows fuzzing through injecting, dropping, reordering, and delaying events from within the application. This translates into the ability to localize the areas under test and perform fuzzing in a systematic manner. In some embodiments, the fuzz testing system tests concurrent asynchronous and event-based code by fuzzing of observable collections, and can generate event streams based on a given statistical distribution.

Event sources generate streams of first-class events. For example, a button raises an event each time it is pressed; likewise, a network receiver raises an event each time a network packet arrives. The fuzz testing system connects event sources to event processors. Each processor generates an event stream by applying a transfer function or transformation to its input event stream. The transfer function is selected by the test programmer and can delay, reorder, drop, select a subset, skip, inject new events, and so on. Event sinks are elements that handle the events. These event sinks encapsulate the behavior reacting to the events. This is where the code that is the subject of the test resides.

Representing events, event sources, processors, and sinks as first-class objects impacts fuzzing in several ways. First, it provides easy access to the event handlers. Fuzzed event data can flow from sources through processors into the sinks, or can be injected straight into the processors (e.g., producing a fake source for testing). Second, it facilitates implementing fuzzing by introducing event processors between the source and the sink. Through operations such as injection and dropping, the fuzz testing system can simulate in a systematic manner a wide range of conditions that fuzzing attempts to cover, including how the application deals with correlation and/or causality between seemingly unrelated event streams.

Particular examples of fuzzing actions are timing changes, spreading events out, making events closer in time, dropping events, changing events into exceptions, simulating premature aborts, and swapping values. For asynchronous programming, the problem is rather different from traditional fuzzing of inputs since the system needs to take into account the notion of time, where most synchronous APIs are invariant with respect to time of entering individual input elements. The fuzz testing system allows manipulating not only the content of events but also the timing and relationship in time of arrival of events. Thus, the fuzz testing system improves the testability of applications and APIs with asynchronous behavior and provides a uniform framework for introducing fuzz testing into such applications.

Figure 1:
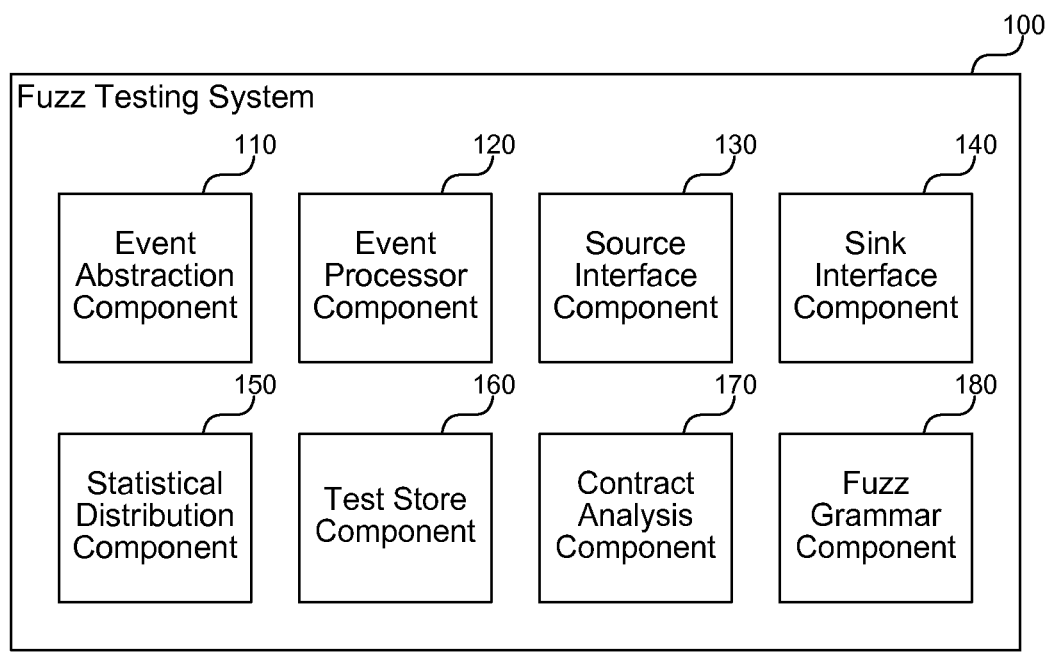
FIG. 1 is a block diagram that illustrates components of the fuzz testing system, in one embodiment.

FIG. 1 is a block diagram that illustrates components of the fuzz testing system, in one embodiment. The system 100 includes an event abstraction component 110, an event processor component 120, a source interface component 130, sink interface component 140, a statistical distribution component 150, test store component 160, a contract analysis component 170, and a fuzz grammar component 180. Each of these components is described in further detail herein.

The event abstraction component 110 provides objects that wrap each event source and event sink to be tested. The objects provide first class representations of each source and sink that can be manipulated as specified by one or more tests. In some embodiments, the component provides an (Observable interface and an (Observer interface that any class in an application can inherit from to represent event sources and event sinks for testing. The following pseudo code declaration illustrates these two interfaces, in one embodiment.

```
interface IObservable<T>
{
    void Subscribe(IObserver<T>);
};
interface IObserver<T>
{
    void OnNext(T);
    void OnError(Exception);
    void OnCompleted( );
};
```

The IObservable interface allows subscribing a particular observer to any object that implements the interface, such as a collection or asynchronous object. The IObserver interface provides functions for handling multiple steps of an operation (OnNext), handling error conditions such as exceptions (OnError), and handling completion of the operation (OnCompleted). These generic interfaces allow modeling of various types of event-based software code.

The event processor component 120 manages one or more processors that operate between one or more event sources and event sinks to modify events as they pass between sources and sinks. Processors can manipulate event data or timing. For example, a processor may manipulate event data by modifying the data, replacing the data with different data, changing the order of subsequent events, repeating event data, slowing passage of the event data to an event sink, speeding up event data, and so forth. A test programmer can write tests to implement any type of processor desired for a particular software application. As another example, a processor may manipulate event timing by stalling one event while another event is delivered, extending event delivery beyond a threshold guaranteed by an interface contract, delivering events more rapidly than usually occurs, modifying dependent event data to arrive before or after related event data, and so forth. In asynchronous software components, testing event timing may be as useful as testing core event handling functionality.

Timing problems often are the most difficult to identify and resolve, and having a repeatable test framework for modifying event timing and verifying correct application behavior makes the software application more robust.

The source interface component 130 connects one or more event sources to event processors through a uniform interface that receives event data from the event sources and provides the event data to the event processor. The source interface may include one or more functions for subscribing to event sources, such as the Subscribe function described herein. The source interface component 130 allows an event processor to intercept event data before the event data arrives at a destination event sink, so that the event processor can manipulate or transform the event data and provided the modified data to the event sink (or discard the data in the case of dropping an event).

The sink interface component 140 connects event processors to one or more event sinks through a uniform interface that allows the processors to provide event data to the event sinks. The sink interface may include one or more functions for providing on-going event data (e.g., OnNext), error conditions (e.g., OnError), and end-of-stream data (e.g., OnCompleted). The sink interface component 140 allows an event processor to provide to the sinks event data that conforms to any preferences of a particular test. The event data may come from data intercepted from one or more event sources or event input created by the test.

The statistical distribution component 150 creates for tests pseudorandom event data that follows a determined statistical distribution. For example, a test author may want to fuzz a certain percentage of one or more event types to ensure desired coverage of various event-handling programmatic code. The statistical distribution component 150 may automatically determine an appropriate distribution based on information about one or more interfaces and interface contracts, as well as other factors. Alternatively or additionally, the test author may manually specify percentages or other metrics of statistical distribution for the component 150 to use to generate event data and/or event data transformations. In some embodiments, the statistical distribution component 150 may store seeds or other information used to generate a particular test run and distribution so that a particular run, although generated randomly, can be easily repeated to reproduce identified bugs or other problems.

The test store component 160 stores one or more tests in a data store. The data store may include one or more files, file systems, hard drives, storage area networks (SANs), databases, cloud-based storage services, or other storage facility. The test store component 160 may store one or more event processors, event transformations performed by configurable processors, expected results, manually generated input data, and any other information determined by a test author for performing a test. The test store component 160 may also log each test run and store information about each test run for reproducing detected errors.

The contract analysis component 170 automatically generates one or more tests and verifies expected results based on a received interface contract. Programmers often define a contract to which an interface adheres to inform users of the interface of behavior to expect when invoking the interface in various ways. For example, the interface contract may specify that particular methods do not crash, and more detailed contract information may include an enforced grammar (e.g., OnCompleted follows OnNext), expected output for particular inputs, a particular time distribution of expected input or output, a guaranteed response time, and so forth. The contract analysis component 170 can use this information both to create tests by fuzzing input event data (or specifically creating invalid data) as well as verifying that behavior in response to the fuzzed input adheres to the specified interface contract. The component 170 may also use the contract information to determine a statistical distribution of event data to provide to the statistical distribution component 150. In some cases, the component 170 may intentionally generate sequences of events that do not satisfy the interface contract to observe the resulting behavior.

The fuzz grammar component 180 receives a grammar for generating fuzzed input. In some embodiments, the system 100 may expose a grammar for generating fuzzed input that is not random but rather is carefully scripted by the test author. The grammar may include commands that generate invalid input, particular event types, particular event timing, and other data useful for particular test cases.

The computing device on which the fuzz testing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
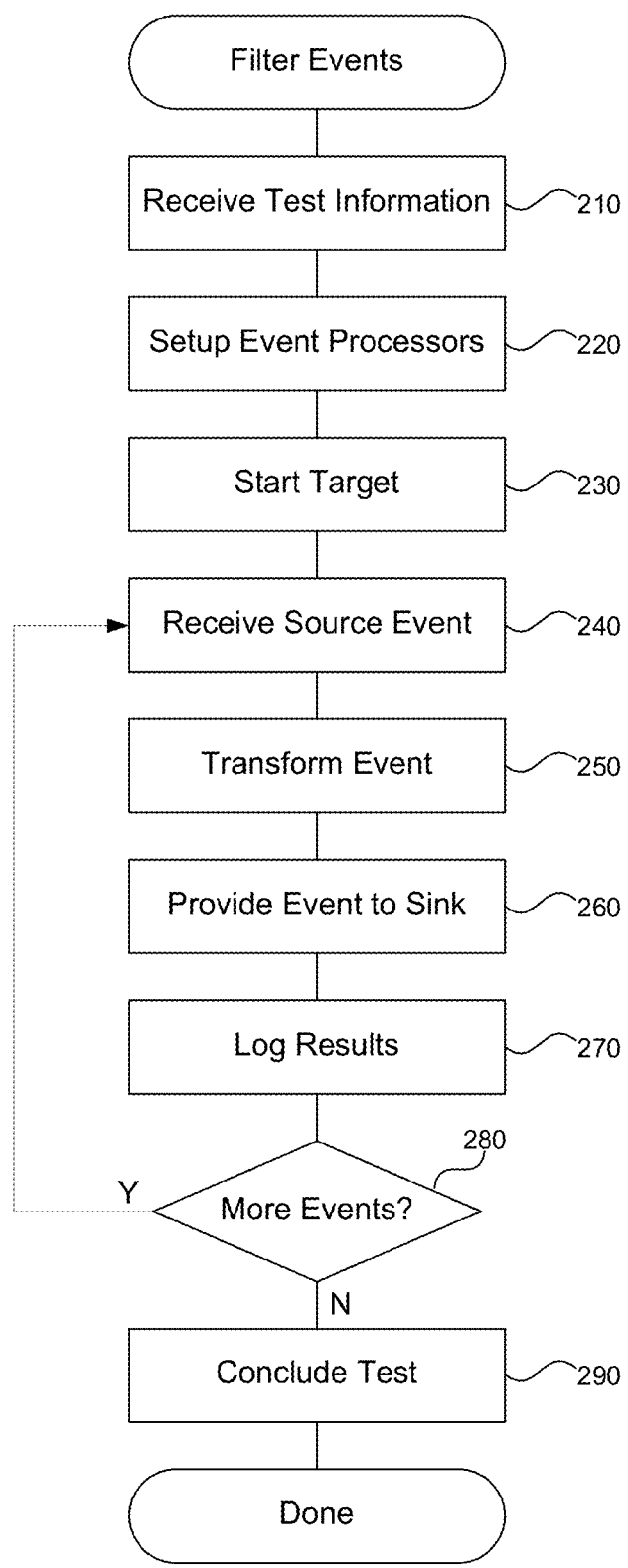
FIG. 2 is a flow diagram that illustrates processing of the fuzz testing system to process events, in one embodiment.

FIG. 2 is a flow diagram that illustrates processing of the fuzz testing system to process events, in one embodiment. Beginning in block 210, the system receives test information that describes one or more tests that involve filtering asynchronous events. For example, a test author may design a test pass for a particular purpose, such as a check-in test or to reproduce a particular software defect. The test information may include one or more processors, information about event timing to produce, events to provide to particular event sinks, and so forth.

Continuing in block 220, the system sets up one or more event processors by connecting the processors between event sources and event sinks. For example, the system may provide a processor that delays, reorders, or drops events, and may connect the processor as directed by the test information between a particular event source and event sink to examine the response of the system to the condition imposed by the processor. Where event sources and event sinks adhere to a uniform interface, the processor may implement a sink-like interface and connect it to the event source (e.g., subscribe to the source) and the processor may implement a source-like interface and connect it to the event sink. In this way, the processor sits between the event source and event sink and can modify and/or create events before they reach the event sink.

Continuing in block 230, the system starts a target application with asynchronous behavior that includes the event sources and event sinks. Applications can perform a wide variety of tasks and the system can be used with many types of applications. The steps involved with starting the application vary based on the particular application's purpose and type. For example, a network application that listens for communication over a particular port may be started by invoking the application and hooking the events related to receiving and sending packets. An application with a user interface may be invoked and the events related to processing user interaction, such as mouse events, hooked to perform a particular test. The system may combine the testing of many types of events to detect unforeseen interactions or dependencies between event-handling software code, such as those related to timing that are hard to detect.

Continuing in block 240, the system receives from an event source a source event through an event processor. The source event may represent many types of actions, such as user interface notifications, network packet arrival, completion of a previously initiated process, and so forth. The processor receives the source event because the processor is connected to the event source and acts as an intermediary to the event sink. Continuing in block 250, the system transforms the source event through the event processor by modifying the event. The modification may include manipulating the event data and/or modifying the event timing so that the event data arrives at the event sink at a different time than the event would arrive in the absence of the processor. The processor may speed up or slow down events, reorder events, duplicate events, drop events, and so forth.

Continuing in block 260, the system provides the modified source event to an event sink from the event processor. The event sink contains event-handling software code for the particular type of event. For example, for a mouse click event, the event sink may determine what item in the user interface a user clicked on. For a network receive event, the event sink may determine a type of packet that arrived and take an action based on the packet type. Continuing in block 270, the system logs information describing the event data provided to the event sink and how the event sink responded to the event data. For example, the system may verify that the event sink did not cause an exception or crash, that the event sink provided a correct return value, that the event sink handled the event within a specified period, and so on. The log information may later be used to reproduce results of a test pass or to report a passage rate of software code in response to fuzz testing.

Continuing in decision block 280, if there are more events to process, then the system loops to block 240 to receive the next event, else the system continues at block 290. The system may run for a predefined period, until a user exits the application under test, or until another terminal condition is reached, such as receiving a particular error. For as long as the test is running, the system receives and transforms events according to the test instructions, and provides the transformed events to specified event sinks (or discards the events in the case of testing dropped events). Although shown serially for ease of illustration, the system may process multiple events concurrently, and in the case of asynchronous testing, may intentionally attempt to deliver many events at the same time or with particular timing with respect to other events.

Continuing in block 290, the system concludes the test and reports the logged information. The system may store test information in a database for later analysis or provide a user interface through which a test author can dynamically monitor and receive test results. After block 290, these steps conclude.

Figure 3:
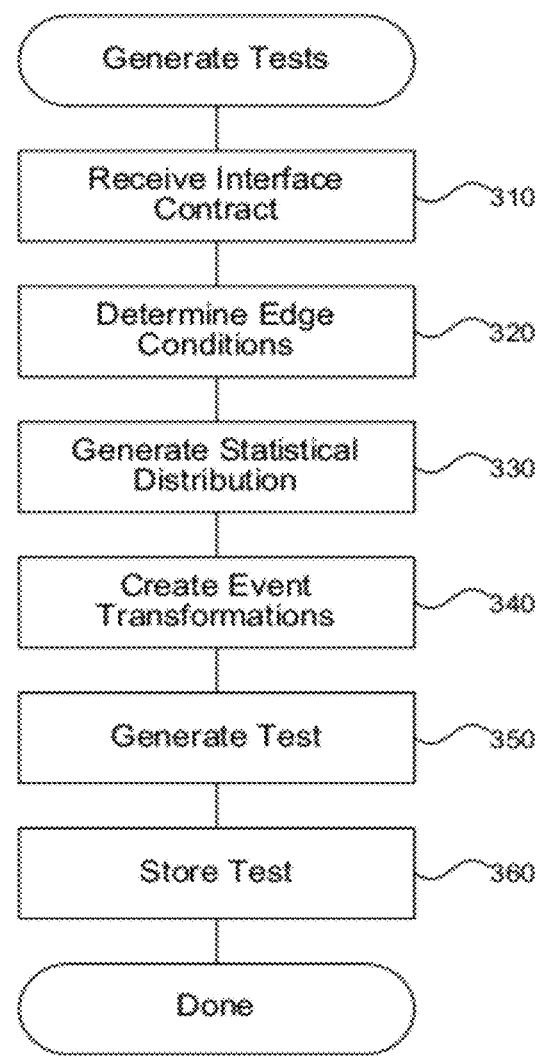
FIG. 3 is a flow diagram that illustrates processing of the fuzz testing system to generate tests from an interface contract, in one embodiment.

FIG. 3 is a flow diagram that illustrates processing of the fuzz testing system to generate tests from an interface contract, in one embodiment. Beginning in block 310, the system receives an interface contract that specifies one or more event-based methods of an interface and at least one expected response of the interface to an asynchronous event. For example, the interface author may provide an interface definition and attributes that describe expected behavior of the interface. Behavior may relate to expected return values, response time, guaranteed timing, or other responses of the interface in response to particular inputs.

Continuing in block 320, the system determines one or more edge conditions that identify input event conditions for which the interface is to be tested for the expected response. For example, the system may identify a last possible timing for an event to arrive before a completion signal indicates that no more events are expected to arrive. The system may also identify input values that lie on a boundary of acceptable values. An interface that responds well to edge conditions often responds well to values that fall well within expected parameters. Described another way, most errors in software code are in response to input values that lie at the edge of our outside of acceptable values.

Continuing in block 330, the system generates a statistical distribution for fuzzing input values that include the determined one or more edge conditions. For example, the system may generate a distribution that will produce a certain percentage of invalid values, a certain percentage of values just inside a threshold of acceptability, and a final percentage of values will within an acceptable range. The statistical distribution may also take into account event timing, specifying that a certain number of events will arrive outside of expected timing, a certain number will arrive at the edge of valid timing, and a remaining number will arrive within an acceptable timing range. In some embodiments, the system may generate a Markov model and treat event processors as state machines that provide event input. The Markov model can be generated with a set of most likely input or least likely input to provide a desired distribution of testing of the application.

Continuing in block 340, the system creates one or more event processors that transform a received event from an event source to produce one or more input values specified by the generated statistical distribution. For example, if the distribution specifies that some events will be delayed for the test, then the system creates an event processor that delays one or more specified types of events. The processor may receive the event from an event source, hold the event for a specified or random interval, and then deliver the held event to an event sink. Similarly, the system can create processors for other types of transformations, such as duplicating events, speeding up events, discarding events, and so forth.

Continuing in block 350, the system generates a test that includes the generated statistical distribution and the created event processors. For example, the system may provide a script using a grammar provided by a test harness that tells the test harness how to produce the desired statistical distribution with the provided event processors. Continuing in block 360, the system stores the generated test for later retrieval for one or more test runs. Each test run may randomly fuzz events to produce the desired statistical distribution and to verify the correct handling of a variety of event data types and timings. After block 360, these steps conclude.

Figure 4:
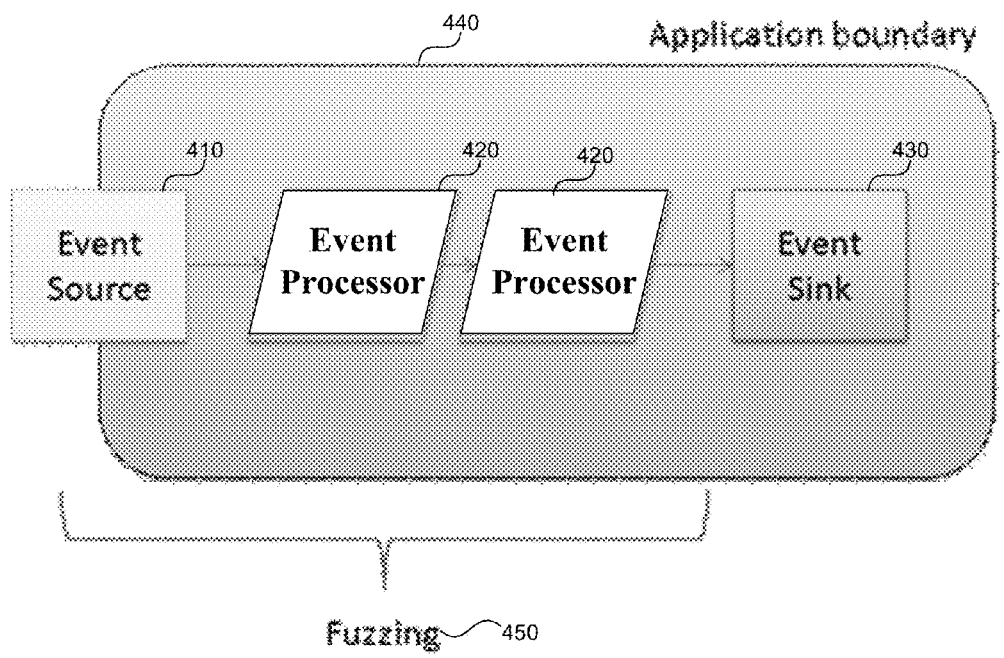
FIG. 4 is a block diagram that illustrates a flow of event data from source to sink using the fuzz testing system, in one embodiment.

FIG. 4 is a block diagram that illustrates a flow of event data from source to sink using the fuzz testing system, in one embodiment. Event data originates from an event source 410. Note that in some cases a test may generate data within an event processor that did not originate from an event source. In typical operation of the application, the event data flows directly from the event source 410 to an event sink 430. For testing purposes, the fuzz testing system introduces one or more event processors 420 between the event source and event sink. The event source 410 and event sink 430 provide a uniform interface for subscribing and providing event data, and thus lend themselves to easy definition and insertion of event processors 420 that modify the normal event-handling process. The event processors 420 may transform the event data in any manner specified by a test author for a particular test. The application boundary 440 shows the area that may lie within the application. Event sources 410 may originate internally or externally to the application. For example, network packets and user mouse movements are events that originate external to the application, but end up being handled by an event sink 430 within the application. Other events, such as timers, may originate within the application. Fuzzing 450 occurs from the event source 410 and within the event processors 420 to provide the event sink 430 with fuzzed event data. The event data may be manipulated by the event processors 420 to test the event sink 430 handling of various expected and non-routine conditions.

In some embodiments, the fuzz testing system modifies event timing as described herein. For asynchronous program code, many bugs occur due to timing related circumstances. For example, a program author may not have adequately considered how the program code reacts to events that arrive after an exception, after a completion event indicates that no more events will arrive, or after unsubscribing from an event source. Timing dependencies such as one data value arriving before or after another data value may expose expectations within the program code that are incorrect, or improper locking behavior for thread safety.

In some embodiments, the fuzz testing system speeds up events. Because the system cannot provide events to an event sink faster than the system receives the events from the event source, the system may queue up events in order to provide a fast burst to the event sink at once or close together in time. The system may also provide events at a normal rate but slow the processing of the event sink, such as by modifying the sink's thread priority, manipulating a timing source that controls the event sink, pausing and resuming the event sink's thread after a delay, and so forth.

From the foregoing, it will be appreciated that specific embodiments of the fuzz testing system have been described herein for purposes of illustration, but that various modifications may be made without deviating from the spirit and scope of the invention. Accordingly, the invention is not limited except as by the appended claims.

We claim:

1. A computer-implemented method for fuzz testing an asynchronous event processing application, the method comprising:

receiving test information that describes one or more tests that involve modifying asynchronous events relative to a contract that specifies expected behavior of an event stream and that follows a determined statistical distribution, based on one or more edge conditions, the edge conditions identifying input event conditions for which the interfaces are to be tested for expected results, wherein an event is representative of a type of action to be performed and not of the actual action, wherein at least one of the events is an event generated internal to an application;

setting up one or more event processors by connecting the processors between event sources and event sinks of the target application, wherein the event processors allow modifying the event stream based on the received test information;

starting the target application with asynchronous behavior that includes the event sources and event sinks;

receiving from an event source a source event through one or more event processors, wherein the event sources are located external from the event sinks that handles the event;

transforming the source event through the event processors by modifying the event;

providing the modified source event to an event sink from the event processor;

storing one or more seeds used to generate a particular test run and distribution so that a particular test run can be repeated to reproduce an identified software defect; and storing one or more tests in a data store, wherein the preceding steps are performed by at least one processor.

2. The method of claim 1 wherein receiving test information comprises receiving a test pass from a test author to reproduce a software defect.

3. The method of claim 1 wherein receiving test information comprises receiving information that identifies event timing related to the event stream contract to produce altered timing for fuzzed test events.

4. The method of claim 1 wherein setting up one or more event processors comprises connecting a processor as directed by the test information between a particular event source and event sink to examine the response of the system to a condition imposed by the processor.

5. The method of claim 1 wherein setting up one or more event processors comprises connecting an event processor to an event source or another event processor that adheres to a uniform interface for abstracting event-related program code.

6. The method of claim 1 wherein the event processors: 1) sit between the event source and event sink, and 2) modify or create events before the events reach the event sink to violate the contract and determine behavior of the application in response.

7. The method of claim 1 wherein starting the target application comprises testing multiple types of asynchronous events to detect timing-related interactions or dependencies between event-handling software code.

8. The method of claim 1 wherein receiving the source event comprises receiving the event through one or more connected event processors situated between the event source and the event sink.

9. The method of claim 1 wherein transforming the source event comprises modifying timing of delivery of the event to the event sink.

10. The method of claim 1 wherein transforming the source event comprises performing a modification selected from the group consisting of removing error notification, removing a subsequent event, firing an event after a completion event, duplicating an event value, changing an order of event values, dropping an event value, and changing the order of a completion event.

11. The method of claim 1 further comprising logging information describing the event data provided to the event sink and how the event sink responded to the event data.

12. A computer system for fuzz testing asynchronous program code, the system comprising:

a processor and memory configured to execute software instructions;

an event abstraction component configured to provide objects that wrap each event source and event sink to be tested, wherein the objects provide representations of each source and sink that can be manipulated as specified by one or more tests;

an event processor component configured to manage one or more event processors that operate between one or more event sources and event sinks to modify events as they pass between sources and sinks, wherein the events are representative of types of actions and not an actual action associated with the types of actions, wherein at least one of the events is an event generated internal to an application;

a source interface component configured to connect one or more event sources to the one or more event processors through a uniform interface that receives event data from the event sources and provides the event data to the one or more event processor;

a sink interface component configured to connect event processors to one or more event sinks through a uniform interface that allows the processors to provide event data to the event sinks;

a statistical distribution component configured to create for tests pseudorandom event data that follows a determined statistical distribution, based on one or more edge conditions, the edge conditions identifying input event conditions for which the interfaces are to be tested for expected results and is further configured to store one or more seeds used to generate a particular test run and distribution so that a particular test run can be repeated to reproduce an identified software defect; and a test store component configured to store one or more tests in a data store.

13. The system of claim 12 wherein the event abstraction component is further configured to provide one or more uniform interfaces that event-related objects in the application can inherit from to represent event sources and event sinks for testing.

14. The system of claim 12 wherein the event processor component is further configured to manage processors that modify event data and/or timing to identify software defects.

15. The system of claim 12 wherein the source interface component is further configured to include one or more functions for subscribing to event sources to allow an event processor to intercept event data before the event data arrives at a destination event sink, so that the event processor can manipulate or transform the event data and provide the modified data to the event sink or discard the data.

16. The system of claim 12 wherein the sink interface component is further configured to include one or more functions for providing on-going event data, error conditions, and end-of-stream data.

17. The system of claim 12 wherein the statistical distribution component is further configured to automatically determine an event distribution based on information about one or more interfaces to be tested.

18. The system of claim 12 further comprising a contract analysis component configured to automatically generate one or more tests and verify expected results based on a received interface contract.

19. A computer-readable storage memory comprising instructions for controlling a computer system to automatically generate fuzzing tests from an interface contract, wherein the instructions, upon execution, cause a processor to perform actions comprising:

receiving an interface contract that specifies one or more event-based methods of an interface and at least one expected response of the interface to an asynchronous event;

determining one or more edge conditions that identify input event conditions for which the interface is to be tested for the expected response;

generating a statistical distribution for fuzzing input values that follows a determined statistical distribution, based on one or more edge conditions, the edge conditions identifying input event conditions for which the interfaces are to be tested for expected results based upon the determined one or more edge conditions;

creating one or more event processors that transform a received event from an event source to produce one or more input values specified by the generated statistical distribution, the one or more event processors further configured to modify a flow of the received event between the event source and an event sink, wherein the received event is representative of a type of action generated external from an application configured to receive the event, and not an actual action associated with the type of action wherein at least one of the events is an event generated internal to an application;

generating a test based upon the generated statistical distribution and the created event processors; and storing the generated test for later retrieval for one or more test runs wherein the stored test includes one or more seeds used to generate the test run and distribution so that the generated test run can be repeated to reproduce an identified software defect.

* * * * *